(12) United States Patent
Arisawa et al.

(10) Patent No.: US 7,039,686 B1
(45) Date of Patent: May 2, 2006

(54) MUSIC-DATA REPRODUCING SYSTEM USING A DOWNLOAD PROGRAM

(75) Inventors: Ryukou Arisawa, Kanagawa (JP); Hiroyuki Sasaki, Kanagawa (JP); Yuichi Fujii, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 633 days.

(21) Appl. No.: 09/642,622

(22) Filed: Aug. 18, 2000

(30) Foreign Application Priority Data

Aug. 20, 1999 (JP) ................................. 11-234254

(51) Int. Cl.
*G06F 17/16* (2006.01)
*G06F 15/177* (2006.01)
*G06F 9/445* (2006.01)

(52) U.S. Cl. ..................... 709/219; 709/221; 717/178
(58) Field of Classification Search ................ 709/203, 709/217, 219, 247, 220–222; 455/517, 414.3, 455/414.4; 717/178
See application file for complete search history.

(56) References Cited

U.S. PATENT DOCUMENTS

| | | | | |
|---|---|---|---|---|
| 5,594,779 A | * | 1/1997 | Goodman | 455/3.04 |
| 5,734,119 A | * | 3/1998 | France et al. | 84/622 |
| 5,900,564 A | | 5/1999 | Kurakake | |
| 6,018,654 A | * | 1/2000 | Valentine et al. | 455/414.4 |
| 6,073,075 A | * | 6/2000 | Kondou et al. | 701/203 |
| 6,138,009 A | * | 10/2000 | Birgerson | 455/419 |
| 6,333,928 B1 | * | 12/2001 | Schaal et al. | 370/360 |
| 6,351,442 B1 | * | 2/2002 | Tagawa et al. | 369/53.41 |
| 6,356,543 B1 | * | 3/2002 | Hall et al. | 370/352 |
| 6,366,791 B1 | * | 4/2002 | Lin et al. | 455/567 |
| 6,513,719 B1 | * | 2/2003 | Imura | 235/492 |
| 6,577,614 B1 | * | 6/2003 | Cook et al. | 370/338 |
| 6,587,684 B1 | * | 7/2003 | Hsu et al. | 455/419 |
| 6,871,048 B1 | * | 3/2005 | Takagaki | 455/66.1 |
| 2002/0065066 A1 | * | 5/2002 | Takagaki | 455/412 |

FOREIGN PATENT DOCUMENTS

| | | |
|---|---|---|
| EP | 0 962 929 A2 | 12/1999 |
| GB | EP 0 991 213 | 5/2000 |
| JP | 08163640 A * | 6/1996 |
| JP | 09331288 A * | 12/1997 |
| JP | 11-164058 | 6/1999 |
| JP | 2001016366 A * | 1/2001 |

OTHER PUBLICATIONS

Imrich Chlamtac et al, "Mobile Computing: Challenges and Potential", Encyclopedia of Computer Science, 4th Edition, international Thomson Publishing, 1998.*
Patent Abstracts of Japan, Publication No.: 11164058, Date of Publication: Jun. 18, 1999.
Patent Abstracts of Japan, Publication No.: 11088556, Date of Publication: Mar. 30, 1999.

* cited by examiner

*Primary Examiner*—David Wiley
*Assistant Examiner*—Yemane Mesfin Gerezgiher
(74) *Attorney, Agent, or Firm*—Pearne & Gordon LLP

(57) ABSTRACT

A data card 101 with music data accumulated therein is inserted into a portable telephone 110 to fetch the music data into the portable telephone, and application software suitable for a music data format prescribed in association with the music data is selected from among a plurality of pieces of application software (131, 133) stored in a server 130 located remotely, and is downloaded. Through this configuration, the application software associated with the music data can be downloaded from the server to the portable telephone by the user's selection.

4 Claims, 4 Drawing Sheets

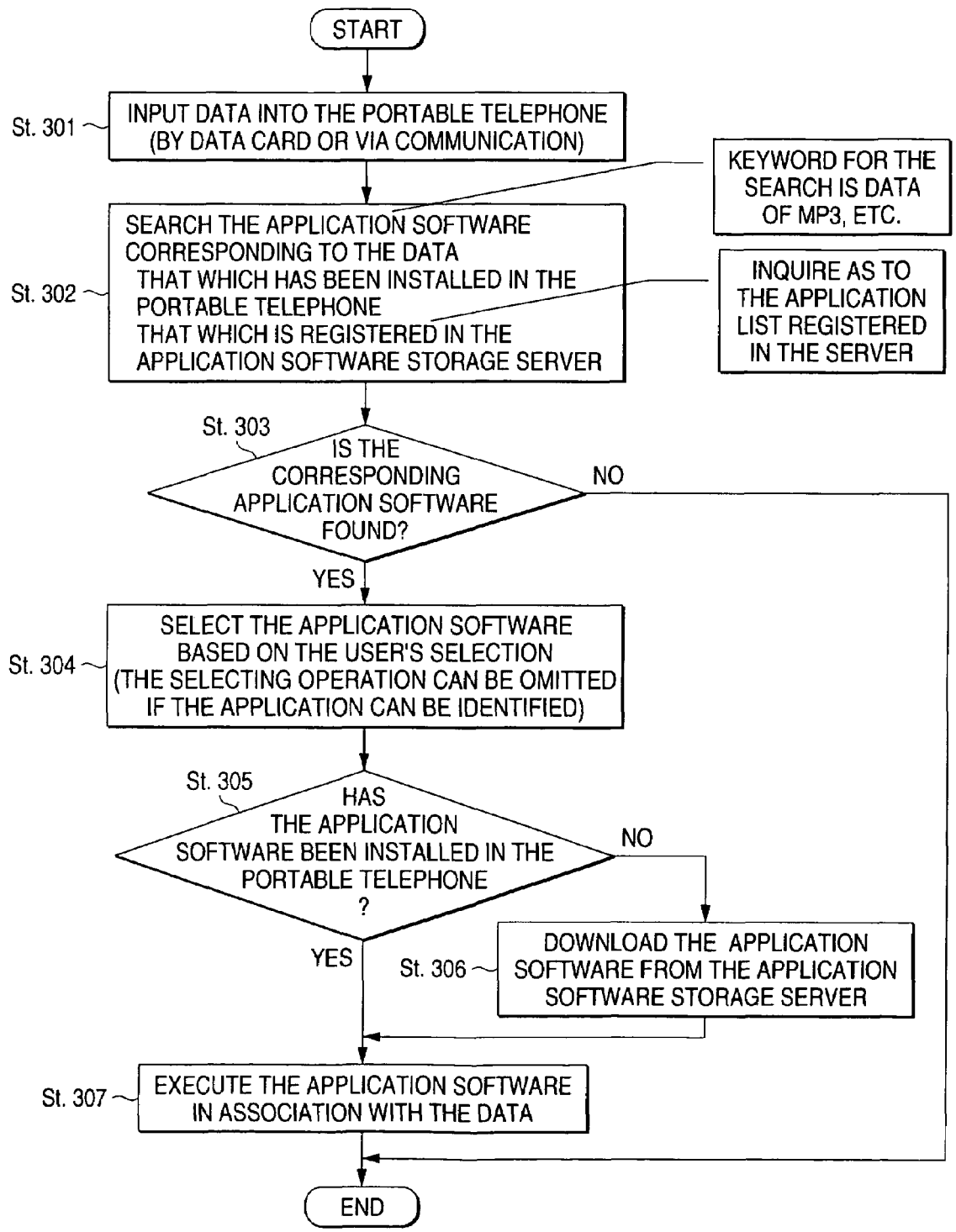

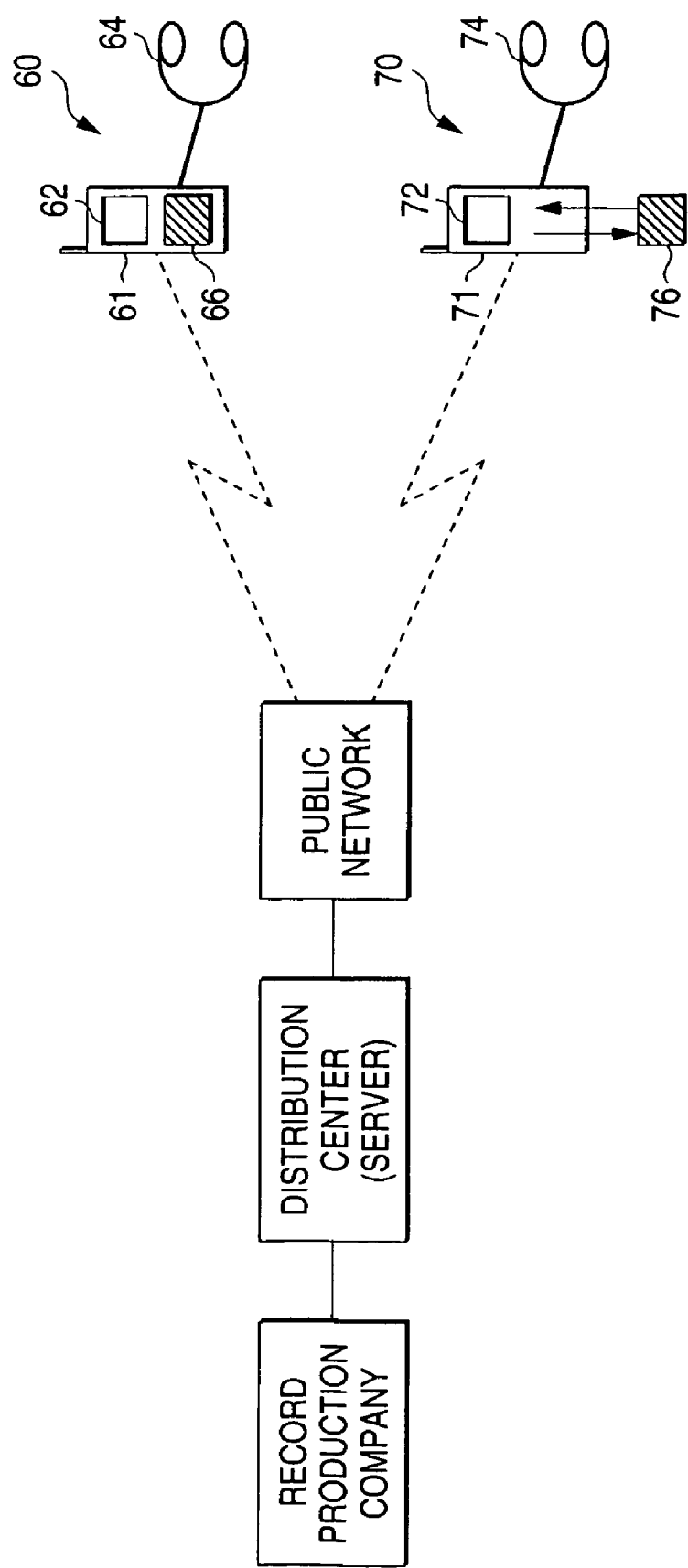

MUSIC-DATA REPRODUCING SYSTEM USING A DOWNLOAD PROGRAM

BACKGROUND OF THE INVENTION

The present invention relates to a system for reproducing music data by a download program, and more particularly to a system which is capable of downloading application software associated with music data from a server to a portable telephone, and which makes it possible to execute the application software (program) downloaded in association with the music data by the portable telephone.

Conventionally, as described in Japanese Patent Publication No. Hei. 11-164058, a music selecting/listening system is known in which music data located remotely is selected and listened to by using a portable telephone or the like. A configuration of this music selecting/listening system is shown in FIG. 4.

In FIG. 4, in a portable telephone 60 incorporating a storage unit 66 in its main body 61, pushbuttons or the like on the main body 61 are operated to call a distribution center. Music data which has already been distributed to the distribution center from a record manufacturing company is outputted to a receiver 64 and a display 62, and is stored in the storage unit 66. The user is then able to enjoy music by reproducing the music data in the storage unit 66 even after the connection to a public communication line has been cut off.

In addition, in a portable telephone 70 having a storage medium 76 which is detachable from a main body 71, as the user downloads music data to the storage medium 76 of the portable telephone 70 by operating pushbuttons or the like on the main body 71, the user is able to enjoy this music data by a display 72 or a receiver 74. In addition, upon drawing out this storage medium 76 and inserting it into another audio unit, the user is able to enjoy reproduced music of higher quality. Further, the music data can be stored in the storage medium 76 by another audio unit, and upon inserting this storage medium 76 into this portable telephone 70, the user is able to enjoy the music.

However, with the above-described conventional music selecting/listening system in which music is selected and listened to by using a portable telephone or the like, the contents of music data which can be selected and listened to are of such specifications that they have been distributed from a record manufacturing company or through another audio unit. Hence, there has been a problem in that although it may be possible to display words on the display of the portable telephone, the user is unable to reproduce the music data according to one's own preferred specifications.

SUMMARY OF THE INVENTION

The invention is designed to overcome the above-described conventional problem, and its object is to provide a music-data reproducing system using a download program and making it possible to download application software associated with music data from a server to a portable telephone by selection by the user.

According to the first aspect of the invention, music-data reproducing system using a download program comprises:
a server having a plurality of pieces of application software; and
a portable telephone which includes:
 a storage means which stores music data;
 a instructing means which instructs the server to download the application software corresponding to a music data format defined in connection with the music data, the application software is downloaded through a communication network; and
 an application software executing means which executes the application software by using the music data after completion of the downloading the application software.

Through the above-described configuration, the application software associated with the music data can be downloaded from the server to the portable telephone by the user's selection.

Further, the music-data reproducing system according to the present invention further includes a history recording means which records a history of the downloading after the downloading of the application software from the server.

Through the above-described configuration, the application software associated with the music data can be downloaded from the server to the portable telephone by the user's selection.

Moreover, according to the music-data reproducing system of the present invention, a list of downloadable application software in the server is transmitted to the portable telephone upon instruction from the portable telephone.

Through the above-described configuration, the application software associated with the music data can be downloaded from the server to the portable telephone by the user's selection, and the downloaded application software can be executed by the portable telephone.

Further, according to the music-data reproducing system of the present invention, the music-data reproducing system further comprising a storage medium capable to be mounted in the portable telephone, the storage medium stores the music data in advance, wherein the portable phone retrieves the music data from the storage medium and executes the application software associated with the music data.

Through the above-described configuration, the application software associated with the music data can be downloaded from the server to the portable telephone by the user's selection, and the downloaded application software can be executed by the portable telephone.

Moreover, according to the music-data reproducing system of the present invention, the music data is stored in the storage means of the portable phone by transmitted through a communication line.

Through the above-described configuration, the application software associated with the music data can be downloaded from the server to the portable telephone by the user's selection.

BRIEF DESCRIPTION OF THE DRAWINGS

FIG. 3 is a flowchart for explaining the operation of the music-data reproducing system using a download program in accordance with the embodiment of the invention.

FIG. 4 is a diagram illustrating the configuration of a conventional portable music selecting/listening system.

DETAILED DESCRIPTION OF THE PREFERRED EMBODIMENET

Figure 1:
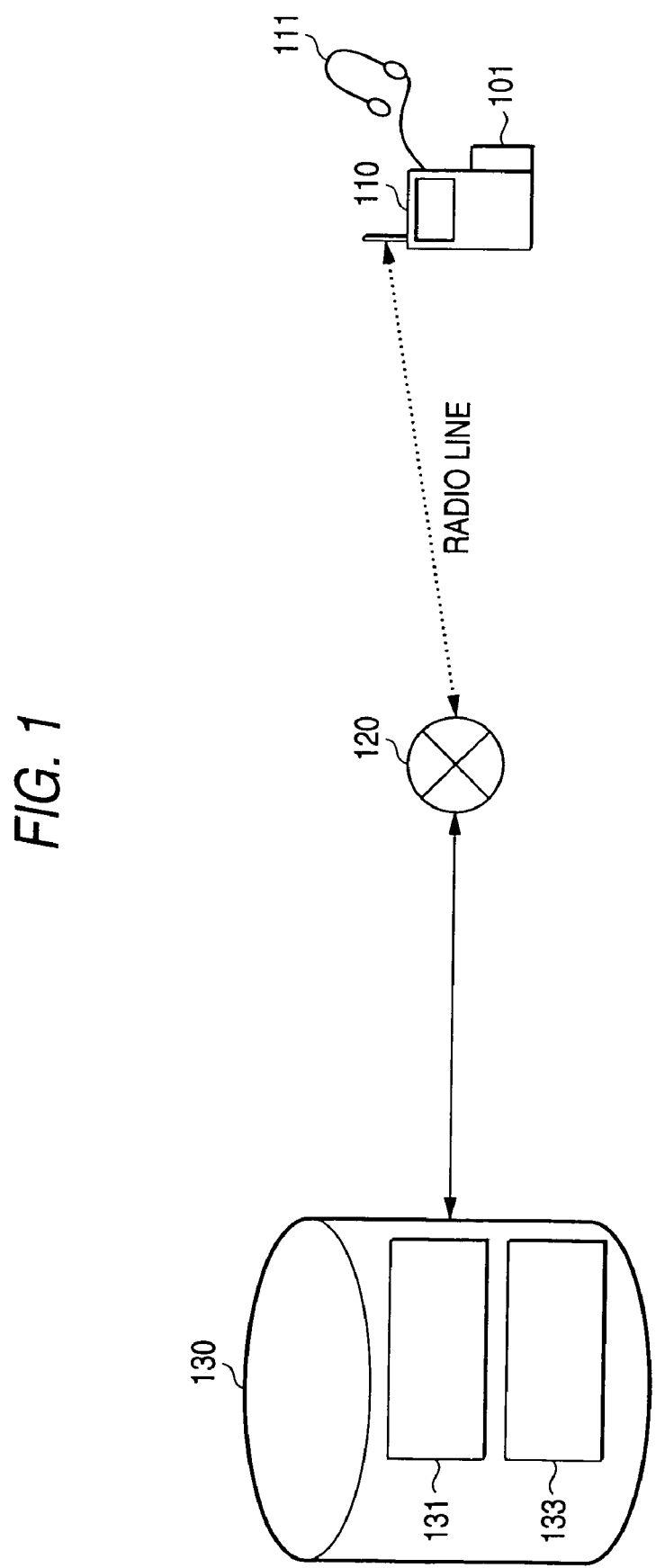
FIG. 1 is a diagram illustrating the configuration of a music-data reproducing system using a download program in accordance with an embodiment of the invention.
Figure 2:
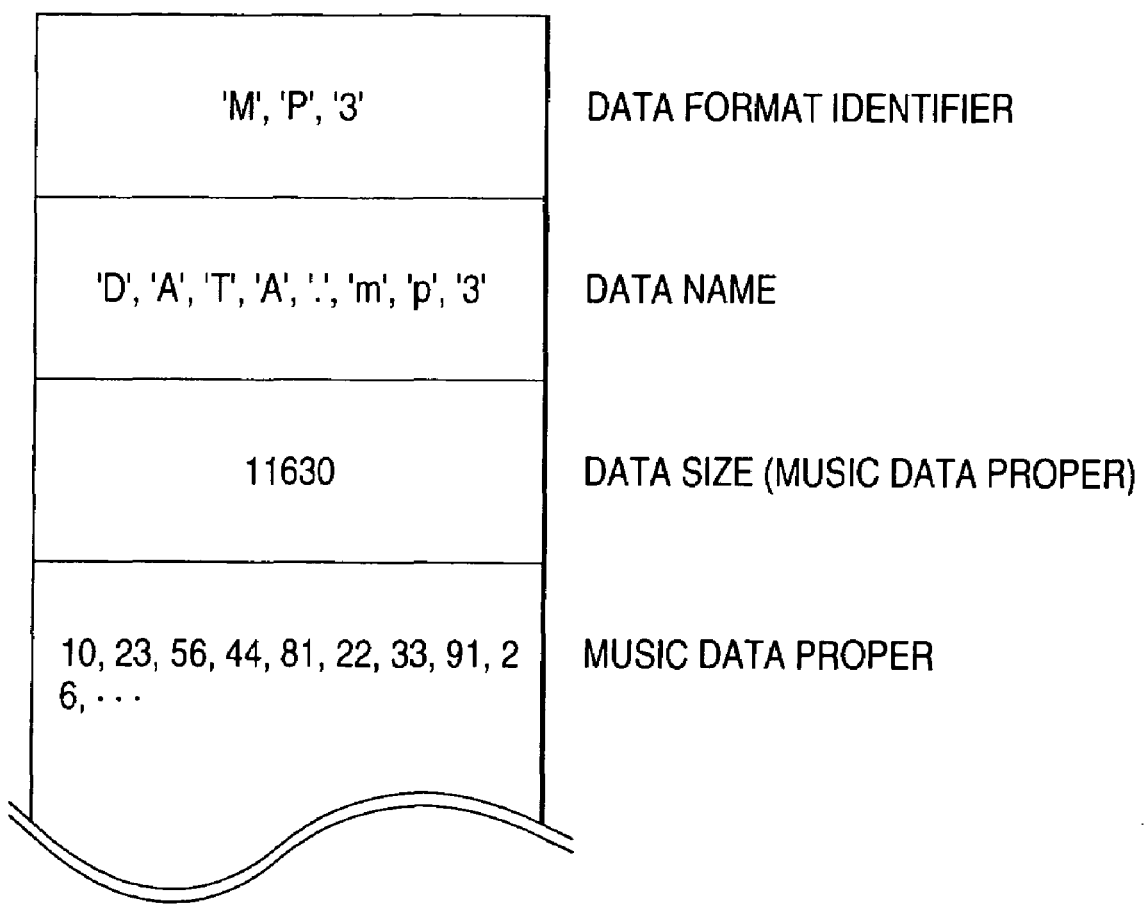
FIG. 2 is a diagram illustrating the structure of music data in accordance with the embodiment of the invention.

Referring now to FIGS. 1 to 3, a description will be given of an embodiment of the invention.

FIG. 1 is a diagram illustrating a schematic configuration of a music-data reproducing system using a download program in accordance with the invention. In FIG. 1, the music-data reproducing system using a download program in accordance with the invention is comprised of a portable telephone 110 capable of fetching music data from a data card 101 into which music data has been fetched in advance; a communication network 120 to which the portable telephone 110 is line-connected through a wireless line; and an information provider (application software storage server) 130 which is a server connected to the communication network 120 through a wire line to provide application software, and in which a plurality of pieces of application software (131, 133) are stored.

Music data which is written in the data card 101 is music data which is written in a music data format such as MP3, MPEG, Quick-Time, etc. For instance, music data of the aforementioned music data format is directly purchased (copied) to the data card 101 or the portable telephone 110 from a personal computer through Internet or from an exclusive-use terminal installed in a convenience store or the like, though not shown.

Music data is thus fetched to the portable telephone. Software for reproducing this music data of the music data format is not installed in advance in the main body of the portable telephone, and necessary software is used by being downloaded from the provider (server) to the portable telephone.

In addition, in a case where application software for reproduction has already been downloaded from the server and has been installed in the portable telephone, and by executing the software as it is, it is possible to reproduce music data according to the user's preferred specifications by a headphone 111 attached to the portable telephone 110 or by the display means.

It should be noted that if the application software for reproduction has not been downloaded from the server, the user inquires the information provider (application software storage server) 130 through the communication network 120 as to what application software is available, and a list of pieces of application software is displayed on the display screen of the portable telephone. If the application software desired by the user is available, an instruction is given to download that application software. After the downloading, this application software is executed, thereby making it possible to reproduce the music data by the headphone 111 attached to the portable telephone 110 or by the display means according to the user's preferred specifications.

FIG. 2 is a diagram illustrating the structure of music data, and music data concerning MP3 is shown in FIG. 2. If a further explanation is given to FIG. 2, "MP3" is written as a data format identifier, "data, mp3" is written as data name, "11630" bytes is written as the data size of the music data proper, and data such as "10, 23, 56, 44, 81, 22, 33, 91, 26, . . . " in decimal numbers (although essentially in binary numbers) is written as the contents of the music data proper.

FIG. 3 shows a flowchart for explaining the operation of the music-data reproducing system using a download program in accordance with the invention, which is shown in FIG. 1. Hereafter, a description will be given with reference to this flowchart.

First, in Step (abbreviated as St. in the flowchart) 301, music data is fetched to the portable telephone. As for the method of fetching music data, music data is fetched by using the data card shown in FIG. 1 or an I/O interface (not shown) attached to the main body through a communication line. It should be noted that, as for the method of fetching data to the data card, various methods are conceivable in addition to the aforementioned personal computer and exclusive-use terminal installed in a convenience store or the like, and the technical concept of the invention is not restricted solely to the illustrated method of fetching data.

Next, in Step 302, search is made for the presence or absence of application software corresponding to the aforementioned music data. Namely, search is first made as to whether there is a history of having already fetched that application software to the main body of the portable telephone. For example, in a case where reproduction application software of the data format of MP3 or the like has already been fetched, the fact that that application software has been installed in the portable telephone can be known by the search.

However, in a case where there is no history of having fetched such reproduction application software, since the application software of the music data format has not been installed in the portable telephone, the user searches through the communication network whether that application software has been registered in the information provider (application software storage server). At this time, by making an inquiry from the portable telephone to the information provider (application software storage server) for a list of application software registered in the server, the search can be made by the portable telephone side. Hence, from that list the user is able to confirm the presence or absence of the desired application software in the application software storage server. At this stage, the selection of the application software is not made.

Then, if it is determined in Step 303 that the corresponding application software in the portable telephone or in the application software storage server cannot be found as a result of the search, even if the music data is fetched, that data cannot be reproduced; therefore, the processing ends. Meanwhile, if it has been possible to find the corresponding application software in Step 303, the operation proceeds to an ensuing Step 304.

In Step 304, desired application software is selected by the user's operation. FIG. 1 illustrates an example in which music reproducing application software 131 and karaoke application software have been registered in the information provider (application software storage server) 130, but it is possible to select either one or both of them. Meanwhile, in a case where application software can be specified unitarily, the user's selecting operation may be omitted.

Next, the operation proceeds to Step 305 in which a determination is made as to whether or not the user's preferred application software has been installed in the portable telephone. If the user's preferred application software has not been installed in the portable telephone as a result of the determination, the operation proceeds to Step 306. In Step 306, the application software is downloaded from the application software storage server. Subsequently, the operation proceeds to Step 306.

On the other hand, if it is determined in Step 305 that the user's preferred application software has been installed in the portable telephone, the operation proceeds to Step 307. In Step 307, the application software is executed in association with the data. Upon completion of the execution, the processing ends.

As described above, in accordance with the music-data reproducing system using a download program, an advantage is obtained in that it is possible to download application software associated with music data from a server to a portable telephone, and the program downloaded in association with the music data can be executed by the portable telephone.

What is claimed is:

1. A music-data reproducing system using a download program comprising:
   a server having a plurality of pieces of application software; and
   a portable telephone which includes:
   a storage means which stores music data;
   a history recording means which records a history of downloading application software from the server;
   a search means for searching the history to determine corresponding to a music data format defined in connection with the music data;
   an instructing means which instructs the server to download the application software corresponding to a music data format defined in connection with the music data, the application software is downloaded through a communication network; and
   an application software executing means which executes the application software by using the menu data after completion of the downloading the application software.

2. The music-data reproducing system according to claim 1,
   wherein a list of downloadable application software in the server is transmitted to the portable telephone upon instruction from the portable telephone.

3. The music-data reproducing system according to claim 1,
   the music-data reproducing system further comprising a storage medium capable to be mounted in the portable telephone, the storage medium stores the music data in advance;
   wherein the portable phone retrieves the music data from the storage medium and executes the application software associated with the music data.

4. The music-data reproducing system according to claim 1,
   wherein the music data is stored in the storage means of the portable phone by transmitted through a communication line.

* * * * *

UNITED STATES PATENT AND TRADEMARK OFFICE
CERTIFICATE OF CORRECTION

PATENT NO.        : 7,039,686 B1
APPLICATION NO. : 09/642622
DATED             : May 2, 2006
INVENTOR(S)       : Arisawa et al.

It is certified that error appears in the above-identified patent and that said Letters Patent is hereby corrected as shown below:

In Column 5, lines 13-14, please insert --the presence or absence of application software-- between "determine" and "corresponding"

Signed and Sealed this

Twenty-first Day of November, 2006

JON W. DUDAS
*Director of the United States Patent and Trademark Office*